(12) United States Patent
Cross, Jr. et al.

(10) Patent No.: US 7,925,512 B2
(45) Date of Patent: Apr. 12, 2011

(54) METHOD, SYSTEM, AND APPARATUS FOR A VOICE MARKUP LANGUAGE INTERPRETER AND VOICE BROWSER

(75) Inventors: Charles W. Cross, Jr., Wellington, FL (US); Brien H. Muschett, Palm Beach Gardens, FL (US)

(73) Assignee: Nuance Communications, Inc., Burlington, MA (US)

( * ) Notice: Subject to any disclaimer, the term of this patent is extended or adjusted under 35 U.S.C. 154(b) by 1073 days.

(21) Appl. No.: 10/849,642

(22) Filed: May 19, 2004

(65) Prior Publication Data

US 2005/0261908 A1 Nov. 24, 2005

(51) Int. Cl.
*G10L 21/00* (2006.01)
*G10L 11/00* (2006.01)

(52) U.S. Cl. .................. 704/275; 704/270; 704/270.1
(58) Field of Classification Search ........... 704/270–275
See application file for complete search history.

(56) References Cited

U.S. PATENT DOCUMENTS

| | | | |
|---|---|---|---|
| 5,440,615 A * | 8/1995 | Caccuro et al. ............ 379/88.06 |
| 6,311,159 B1 * | 10/2001 | Van Tichelen et al. ....... 704/275 |
| 6,546,082 B1 * | 4/2003 | Alcendor et al. ............... 379/52 |
| 6,574,601 B1 * | 6/2003 | Brown et al. .............. 704/270.1 |
| 6,604,077 B2 * | 8/2003 | Dragosh et al. ............ 704/270.1 |
| 6,625,576 B2 * | 9/2003 | Kochanski et al. ........... 704/260 |
| 6,801,604 B2 * | 10/2004 | Maes et al. ................. 379/88.17 |
| 6,807,529 B2 * | 10/2004 | Johnson et al. ............ 704/270.1 |
| 6,810,379 B1 * | 10/2004 | Vermeulen et al. ........... 704/260 |
| 6,907,256 B2 * | 6/2005 | Hokao .......................... 455/463 |
| 6,944,594 B2 * | 9/2005 | Busayapongchai et al. .. 704/275 |
| 6,965,925 B1 * | 11/2005 | Shank et al. .................. 709/219 |
| 6,983,250 B2 * | 1/2006 | Guedalia et al. ............. 704/260 |
| 7,016,845 B2 * | 3/2006 | Vora et al. .................. 704/270.1 |
| 7,054,818 B2 * | 5/2006 | Sharma et al. ................ 704/270 |
| 7,092,728 B1 * | 8/2006 | Gress et al. ................... 455/466 |
| 7,099,826 B2 * | 8/2006 | Akabane et al. ............. 704/260 |
| 7,174,006 B2 * | 2/2007 | Guedalia et al. ........... 379/88.13 |
| 7,206,391 B2 * | 4/2007 | Chiu et al. .................. 379/88.25 |
| 7,210,098 B2 * | 4/2007 | Sibal et al. .................... 715/513 |
| 7,225,249 B1 * | 5/2007 | Barry et al. ................... 709/227 |
| 7,251,604 B1 * | 7/2007 | Thenthiruperai .......... 704/270.1 |
| 7,454,346 B1 * | 11/2008 | Dodrill et al. ................ 704/260 |
| 7,571,100 B2 * | 8/2009 | Lenir et al. ................. 704/270.1 |
| 2002/0110248 A1 * | 8/2002 | Kovales et al. ................ 381/56 |
| 2002/0152067 A1 * | 10/2002 | Viikki et al. .................. 704/231 |
| 2002/0165719 A1 * | 11/2002 | Wang et al. ................ 704/270.1 |
| 2003/0055884 A1 * | 3/2003 | Yuen et al. .................... 709/203 |
| 2003/0061052 A1 * | 3/2003 | Breuer .......................... 704/266 |

(Continued)

OTHER PUBLICATIONS

Wyld, B., et al., "SPEECHSC Protocol Evaluation", Internet Engineering Task Force, The Internet Society, Jun. 2003.
Shanmugham, S., "Media Resource Control Protocol Version 2 (MRCPv2)", Internet Engineering Task Force, The Internet Society, May 12, 2004.

(Continued)

*Primary Examiner* — Eric Yen
(74) *Attorney, Agent, or Firm* — Wolf, Greenfield & Sacks, P.C.

(57) ABSTRACT

The present invention can include a method of allocating an interpreter module within an application program. The application program can create one or more interpreter module instances. The method also can include updating a property descriptor of the interpreter module instance and directing the interpreter module instance to allocate speech and audio resources. Content then can be loaded into the interpreter module instance and run.

17 Claims, 2 Drawing Sheets

U.S. PATENT DOCUMENTS

| | | |
|---|---|---|
| 2003/0120494 A1* | 6/2003 | Jost et al. .................. 704/275 |
| 2003/0139928 A1* | 7/2003 | Krupatkin et al. ............ 704/260 |
| 2003/0167172 A1* | 9/2003 | Johnson et al. ............ 704/270.1 |
| 2004/0054523 A1* | 3/2004 | Backhaus .................. 704/201 |
| 2004/0128136 A1* | 7/2004 | Irani ........................ 704/270.1 |
| 2004/0172254 A1* | 9/2004 | Sharma et al. ............ 704/270.1 |

OTHER PUBLICATIONS

Wilson, L, "X+V Is a Markup Language, Not a Roman Math Expression", IBM Developer Works, Aug. 19, 2003.

* cited by examiner

METHOD, SYSTEM, AND APPARATUS FOR A VOICE MARKUP LANGUAGE INTERPRETER AND VOICE BROWSER

BACKGROUND

1. Field of the Invention

The present invention relates to multimodal browsers and voice servers and, more particularly, to voice markup language interpreters.

2. Description of the Related Art

Visual browsers are complex application programs that can render graphic markup languages such as Hypertext Markup Language (HTML) or Extensible HTML (XHTML). As such, visual browsers lack the ability to process audible input and/or output. Still, visual browsers enjoy a significant user base.

Voice browsers are the audio counterparts of visual browsers. More particularly, voice browsers can render voice markup languages such as Voice Extensible Markup Language (VXML), thereby allowing users to interact with the voice browser using speech. Voice browsers, however, are unable to process or render graphic markup languages.

Recent developments in Web-based applications have led to the development of multimodal interfaces. Multimodal interfaces allow users to access multimodal content, or content having both graphical and audible queues. Through a multimodal interface, the user can choose to interact or access content using graphic input such as a keyboard or pointer entry, using an audible queue such as a speech input, or using combination of both. For example, one variety of multimodal interface is a multimodal browser that can render XHTML and Voice markup language, also referred to as X+V markup language.

To provide both graphic and voice functionality, developers are left with the option of developing a new multimodal browser or, alternatively, redesigning existing visual browsers to provide voice functionality. The complexity of visual browsers, and browsers in general, however, makes such efforts both time consuming and costly.

SUMMARY OF THE INVENTION

The inventive arrangements disclosed herein provide a solution for providing speech and/or voice processing functionality within a host application program. In one embodiment, a library of voice markup language functions is provided as a voice markup language interpreter that is accessible via an application programming interface. In another embodiment, one or more instances of the voice interpreter can be created by a host application program thereby providing speech processing capabilities for the host application program. For example, the inventive arrangements disclosed herein can be used to voice-enable a visual browser or as a voice browser for use in a voice server.

One aspect of the present invention can include a method of allocating an interpreter module within an application program. The application program can create one or more interpreter module instances. The method also can include updating a property descriptor of the interpreter module instance and directing the interpreter module instance to allocate speech and audio resources. Content then can be loaded into the interpreter module instance and run.

Another aspect of the present invention can include a system for processing speech within a host application program. The system can include a voice markup language interpreter that is instantiated by the host application program and an application programming interface through which the voice markup language interpreter communicates with the host application program. The system further can include an updateable property descriptor specifying a listening mode and a language to be used by the voice markup language interpreter. The voice markup language interpreter can be configured to allocate speech resources and audio resources under direction of the host application program, wherein the audio resources are distinct from the speech resources.

Another aspect of the present invention can include a machine readable storage being programmed to cause a machine to perform the various steps disclosed herein.

BRIEF DESCRIPTION OF THE DRAWINGS

There are shown in the drawings, embodiments that are presently preferred; it being understood, however, that the invention is not limited to the precise arrangements and instrumentalities shown.

DETAILED DESCRIPTION OF THE INVENTION

Figure 1:
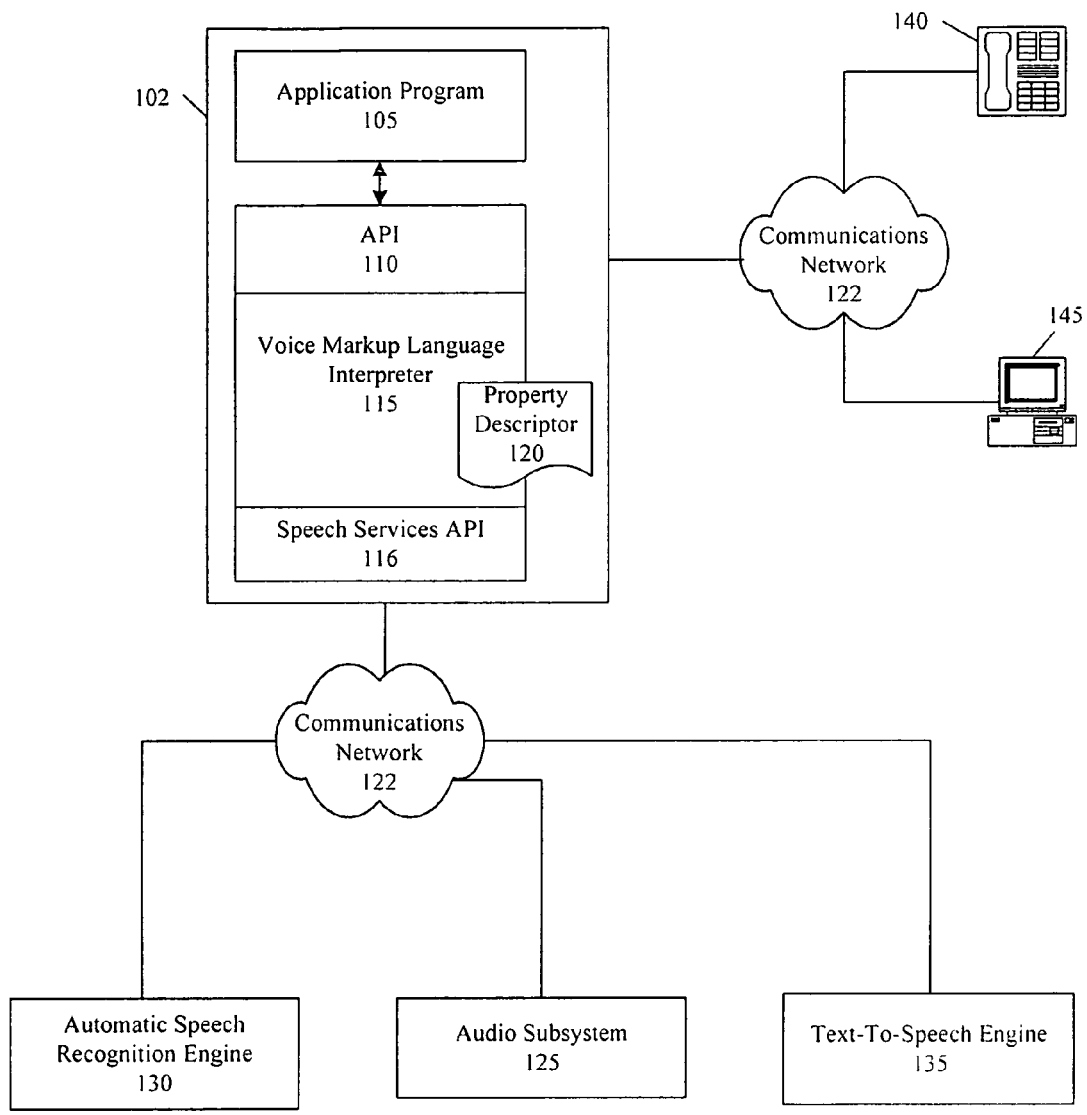
FIG. 1 is a schematic diagram illustrating a system in which a voice markup language interpreter can be used in accordance with one embodiment of the present invention.

FIG. 1 is a schematic diagram illustrating a system 100 in which a voice markup language interpreter can be used in accordance with one embodiment of the present invention. As shown, the system 100 can include a computer system 102 having an application program (application) 105, and a voice markup language interpreter (interpreter) 115. The system 100 further can include audio resources such as an audio subsystem 125 and speech processing resources such as an automatic speech recognition (ASR) engine 130 and a text-to-speech (TTS) engine 135. As shown, the interpreter 115 can run in the same address space as the application 105.

The computer system 102 can be a server for hosting one or more applications such as voice browsers, interactive voice response systems, voice servers, or the like. For example, in one embodiment, the application 105 can be a visual browser that is to be voice or speech enabled. Accordingly, the application 105 can function as a multimodal browser once the interpreter 115 is instantiated. In another embodiment, the application 105 can be a voice server. In that case, the interpreter 115 can function as, or form, a voice browser. Regardless, the application 105 can be configured to create one or more instances of the interpreter 115, for example a pool of interpreters 115, as may be required, depending upon intended use.

The interpreter 115 can include an application programming interface (API) 110 and a property descriptor 120. The interpreter 115 can be implemented as a lightweight software component. When more than one instance of the interpreter 115 is instantiated, for example, the interpreter 115 instances can function as multiple concurrent and serially reusable processing modules.

The API 110 provides a library of functions, methods, and the like for accessing the functionality of the interpreter 115. As such, the API 110 provides an interface through which the application 105 and the interpreter 115 can communicate. The property descriptor 120 is a configurable electronic document that specifies operational parameters of the interpreter 115. In one embodiment, the property descriptor 120 can specify modes of operation and a locale. For example, one mode of operation can include a listening mode such as "always listening" or "push to talk", or "push to activate". The listening mode determines when audio data is streamed to the speech recognition engine and how the end of an utterance is determined. That is, the listening mode can specify how audio events are to be detected and handled. The locale can specify the language to be used in speech processing functions, whether speech recognition or text-to-speech.

Table 1 below illustrates additional properties that can be specified in or by the property descriptor 120.

TABLE 1

| | |
|---|---|
| CACHE_FC_SIZE | Property used to define the maximum size of the file cache. |
| CACHE_FC_THOLD | Property used to define the file cache threshold. |
| CACHE_FSE_LEN | Property used to define the maximum size of a file entry for the platform file system. |
| CACHE_MC_SIZE | Property used to define the maximum size of the memory cache. |
| CACHE_NAME | Property used to define the symbolic name of the resource cache to use. |
| CALL_TIMEOUT | Property used to configure the length of time the browser should wait to connect to a call if not provided one. |
| FETCH_EXPIRES | Property used to define the default expiration time for fetched resources. |
| FETCH_THREADS | Property used to define the initial number of fetch threads to used for fetching resources. |
| FETCH_TIMEOUT | Property used to define the default fetch timeout. |
| LOCALE_LIST | Property used to define the possible set of locales to be used by the VoiceXML application. |
| OVERRIDE_SERVICES | Property used to override the default mechanism for obtaining browser services. |
| OVERRIDE_SITE_DOC | Property used to override the site document URL for this browser session. |
| PP_CAPACITY | Property used to set the size of the parser tool capacity of the interpreter. |
| PP_PRELOAD | Property used to set the preload count for the parser pool of the interpreter. |
| SITE_DOC | Property used to set the site document URL. |

In one embodiment, the interpreter 115 can function as a voice markup language interpreter. Such can be the case, for example, where the application 105 is implemented as a visual browser. The interpreter 115 can be configured to parse and render any of a variety of voice markup languages such as Voice Extensible Markup Language (VXML) or any subset thereof. For example, the interpreter 115 can be configured to render the subset of VXML used by the Extensible Hypertext Markup Language (XHTML) and Voice markup language, commonly referred to as X+V markup language. In this manner, the interpreter 115 can function in a complementary fashion with the application 105 to provide multimodal browsing. The application 105 can process graphical markup language and provide any voice markup language to the interpreter 115 for rendering.

In another embodiment, the interpreter 115 can provide the core voice markup language rendering capabilities for implementing a voice browser. In that case, the application 105 can be a voice server.

As noted, the system 100 can include a variety of resources such as the audio subsystem 125, the ASR engine 130, and the TTS engine 135. The audio resources are distinct from the speech resources. More particularly, the audio subsystem 125 is distinct from both the ASR engine 130 and the TTS engine 135. Rather than incorporating audio handling capabilities within the speech resources, i.e. the ASR engine 130 and/or the TTS engine 135, the audio subsystem 125 can handle such functions. The interpreter 115 can manipulate the speech resources through the speech services API 116. This allows the interpreter 115 to be implemented independently of the speech resources, thereby facilitating the use of speech resources from different vendors.

Thus, in one embodiment, the audio subsystem 125 can capture or record audio from a user input and provide that audio to the ASR engine 130. Similarly, the audio subsystem 125 can obtain recorded and/or synthetic speech from the TTS engine 135 and/or other audio playback system and provide that audio to a user. The audio subsystem 125 further can route audio between the various speech resources and a user device.

The audio subsystem 125 can include one or more audio listeners. For example, the audio subsystem 125 can include play and record listeners. The record listener can detect and record audio, including speech, received from a user, for example via a communications link. Such speech can be recorded and provided to the ASR engine 130. The play listener can detect speech generated by the TTS engine 135 to be played back to a user.

Because each of the processing resources is distinct. i.e. the audio subsystem 125, the ASR engine 130, and the TTS engine 135, each can be allocated individually. Such an arrangement further allows audio to be handled in a manner that is independent from the processing functions to be performed upon the audio.

While the application 105 and the interpreter 115 can function in a cooperative manner, the audio subsystem 125, the ASR engine 130, and the TTS engine 135 need not be part of the same system. That is, in one embodiment, the processing resources can execute in one or more other computer systems. Such computer systems can be proximate to, or remotely located from the computer system 102. For example, the audio and speech resources can be provided as individual services that are accessible to the interpreter 115 and application 105 via a communications network 122, which can include, but is not limited to, a local area network, a wide area network, the public switched telephone network, a wireless or mobile communications network, the Internet, and/or the like. Still, in another embodiment, the resources can be located within a same computer system as the application 105 and/or the interpreter 115.

In operation, once one or more instances of the interpreter 115 are created by the application 105. Once created, the application 105 can access the audio and speech resources via the interpreter 115. That is, the interpreter 115 can render voice markup languages and utilize the audio subsystem 125, the ASR engine 130, and the TTS engine 135. Accordingly, voice services can be provided to a user accessing the computer system 102 via a telephone 140 or a computer system 145 over another communications network 122.

The application program 105 can be synchronized with the interpreter 115 through events and state change information, i.e. through the addition of XML event listeners and state listeners. Events and state changes are propagated from the interpreter 115 to the application 105 through these event listeners. The application 105 uses the API's for adding event and state change listeners to the interpreter 115. A listener is an object oriented programming technique for implementing a callback function. Using a state change event allows API's to function properly as some API's may fail if the interpreter 115 is in the wrong state. Accordingly, the application 105 can wait until the interpreter 115 is in the correct state, using the state change listener, before calling those API's that are sensitive to the internal state of the interpreter 115.

Figure 2:
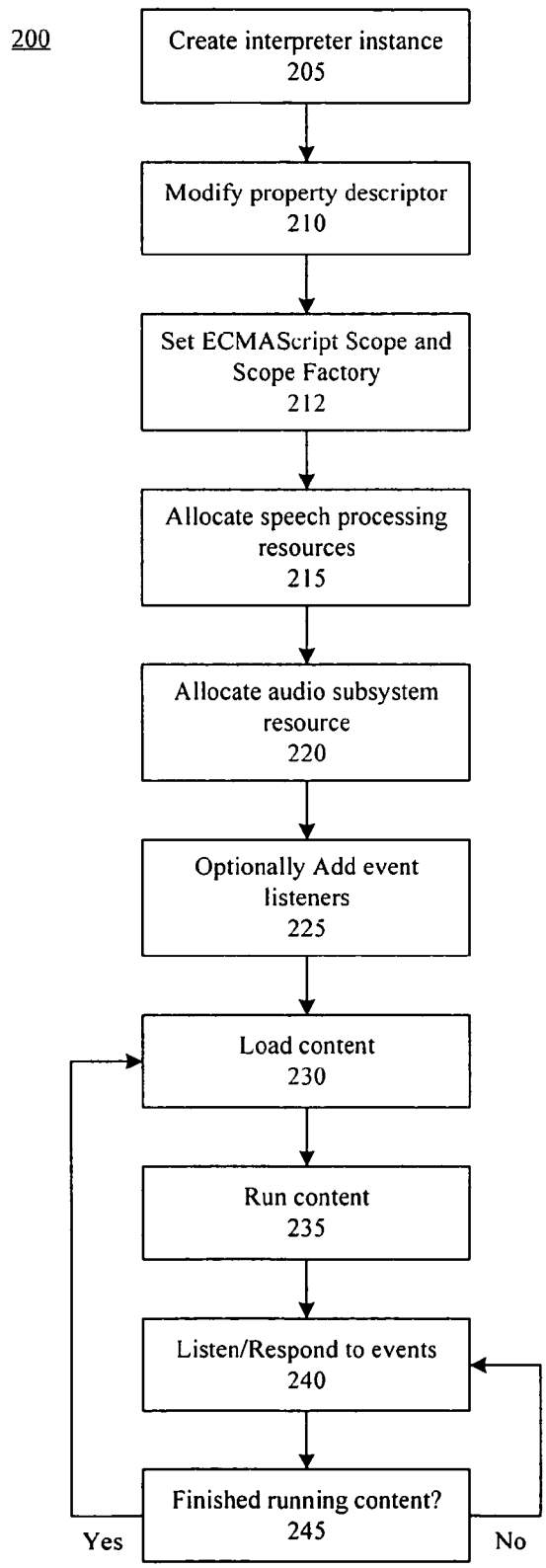
FIG. 2 is a flow chart illustrating a method of allocating a voice markup language interpreter in accordance with another embodiment of the present invention.

FIG. 2 is a flow chart illustrating a method 200 of allocating a voice markup language interpreter in accordance with another embodiment of the present invention. The method 200 can be performed by an application program having a need for voice processing functionality. Accordingly, the method 200 can begin in a state where the application program has detected a need for voice processing or multimodal operation, for example by parsing a markup language document and identifying one or more tags associated with speech and/or audio processing.

In step 205, the application program, via the API provided as part of the interpreter, can create an instance of the interpreter. For example, the instance can be created using a factory design pattern or a constructor. In step 210, the application program can modify the property descriptor of the interpreter in accordance with the desired listening mode and language to be used to interact with the interpreter. The application can be programmed to configure the property descriptor to cause the interpreter to operate in a particular fashion or for a particular mode of operation.

In step 212, an ECMAScript Scope and Scope Factory can be set. The interpreter used with the multimodal browser can share the ECMAScript engine from the visual browser, i.e. the application, through an abstract interface called Scope. Scope is an abstraction of the hierarchical VoiceXML variable scopes. A setScopeFactory method enables the application to pass a callback function to the interpreter which allows the interpreter to create new scopes (ECMAScript objects) at runtime.

Additionally, the interpreter used with the multimodal browser shares the Document Object Model (DOM) of the document being rendered by the visual browser. This is done with an API setECMAScriptScope. Synchronization between speech recognition events and update of visual input elements can then be implemented by the interpreter directly updating the DOM using the Scope interface and the "document" variable contained in the Scope object passed in through setECMAScriptScope.

In step 215, the application program can instruct the newly created interpreter instance to begin allocating resources. More particularly, the interpreter can be instructed to allocate speech resources such as an ASR engine and/or a TTS engine. In step 220, the application program can instruct the interpreter to allocate the audio subsystem. As noted, the audio subsystem can be allocated separately from the speech resources as the audio subsystem is distinct from the speech resources. In step 225, the application program optionally can instruct the interpreter to add event listeners. For example, in the case where the interpreter is to function with a visual browser, the event listeners can be Extensible Markup Language (XML) listeners.

In step 230, content can be loaded into the interpreter from the application program. For example, in the case where the interpreter functions as a voice browser in a voice server context, a site VXML or other site voice markup language document can be set. The current VXML or other voice markup language document can be set for the current browser session. In the case where the interpreter functions as a multimodal browser, VXML link fragments for Command and Control and Content Navigation (C3N) can be loaded. Further, VXML form fragments can be loaded as content to be rendered.

In step 235, the content can be executed or run. For example, where the interpreter functions with a visual browser, the interpreter can enable document level link grammars and run a form fragment by identifier. Where the interpreter functions as a voice browser, the current voice markup language document can be run. In any case, the interpreter can begin listening for events.

The application can listen and respond to events generated by the interpreter in step 240. Notably, the application can determine whether the received event is a user event such as a VoiceXML user event from a C3N grammar. If so, the interpreter can execute a user interface response to a C3N event. If the event is an XML event, a Document Object Model level 2 (DOM2) event, or an event formatted using another suitable protocol can be created and propagated through the DOM.

In step 245, if the interpreter is finished running the loaded content, the method can continue to step 230 to load and execute additional content. If not, the method can loop back to step 240 to continue listening and responding to further events.

While the method 200 has been descriptive of a single interpreter, it should be appreciated that multiple instances of the interpreter can be created and run. Accordingly, in another embodiment, a pool of one or more interpreter instances can be created by the application program. A threading policy can be established in the application program to facilitate the asynchronous operation of each of the interpreter instances.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method of providing an application, which presents a visual interface to a human user, without voice processing functionality with access to voice processing functionality that is provided by at least one system that comprises at least one speech resource and/or at least one audio resource via a voice markup language interpreter the method comprising:

receiving, at the voice markup language interpreter, a first request from the application to create a first interpreter instance, the first request specifying a first property descriptor indicative of a desired listening mode and language for interacting with first interpreter instance;

creating the first interpreter instance;

receiving, at the voice markup language interpreter, a second request from the application to create a second interpreter instance, the second request specifying a second property descriptor indicative of a desired listening mode and language for interacting with the second interpreter instance;

creating the second interpreter instance so that the first interpreter instance and second interpreter instance run concurrently;

receiving, at the first interpreter instance, voice markup content from the application; and in response to receiving the voice markup content, loading input from the application into the at least one speech resource and/or the at least one audio resource.

2. The method of claim 1, further comprising configuring event listeners for the first interpreter instance.

3. The method of claim 1, wherein the application is a visual browser and the interpreter provides voice processing functionality for the visual browser.

4. The method of claim 1, wherein the application is a voice server and the interpreter is a voice browser.

5. The method of claim 1, wherein said loading step comprises allocating a text-to-speech component, an automatic speech recognition component, and/or an audio processing subsystem, wherein the audio processing subsystem is distinct from the text-to-speech component and the automatic speech recognition component.

6. The method of claim 5, wherein the audio processing subsystem records audio for the automatic speech recognition component and plays audio for the text-to-speech component.

7. The method of claim 6, wherein the audio processing subsystem further records user speech received via a communications link.

8. The method of claim 1, further comprising establishing a threading policy within the application for operation of the first and second interpreter instances, wherein each of the first and second interpreter instances operates asynchronously from the other.

9. The method of claim 1, wherein the interpreter receives the first and second requests from the application via an application programming interface (API) and wherein the method further comprises:

detecting by the application a need for voice processing functionality; and in response to detecting the need, sending the first request via the API.

10. The method of claim 1, wherein the at least one system that comprises at least one speech resource and/or at least one audio resource comprises at least one speech resource.

11. The method of claim 1, wherein the at least one system that comprises at least one speech resource and/or at least one audio resource comprises at least one audio resource.

12. The method of claim 1, wherein the application is a browser.

13. The method of claim 12, wherein the browser is a visual browser.

14. The method of claim 12, wherein the browser is a multimodal browser.

15. The method of claim 1, wherein the application directly presents the visual interface to the human user.

16. At least one tangible computer readable medium encoded with instructions that, when executed on a computer system, perform a method of providing an application, which presents a visual interface to a human user, without voice processing functionality with access to voice processing functionality that is provided by at least one speech resource and at least one audio resource via a voice markup language interpreter the method comprising:

receiving, at the voice markup language interpreter, a first request from the application to create a first interpreter instance, the first request specifying a first property descriptor indicative of a desired listening mode and language for interacting with first interpreter instance;

creating the first interpreter instance;

receiving, at the voice markup language interpreter, a second request from the application to create a second interpreter instance, the second request specifying a second property descriptor indicative of a desired listening mode and language for interacting with the second interpreter instance;

creating the second interpreter instance so that the first interpreter instance and second interpreter instance run concurrently;

receiving, at the first interpreter instance, voice markup content from the application; and in response to receiving the voice markup content, loading input from the application the at least one speech resource and/or the at least one audio resource.

17. A computer, having an application, which presents a visual interface to a human user, executing thereon, the computer comprising:

at least one memory that stores computer-executable instructions for a voice markup language interpreter; and at least one processor, coupled to the at least one memory, that executes the computer-executable instructions for the voice markup language interpreter to:

receive, at the voice markup language interpreter, a first request from the application to create a first interpreter instance, the first request specifying a first property descriptor indicative of a desired listening mode and language for interacting with first interpreter instance;

creating the first interpreter instance;

receive, at the voice markup language interpreter, a second request from the application to create a second interpreter instance, the second request specifying a second property descriptor indicative of a desired listening mode and language for interacting with the second interpreter instance;

create the second interpreter instance so that the first interpreter instance and second interpreter instance run concurrently;

receive, at the first interpreter instance, voice markup content from the application; and in response to receiving the voice markup content, load input from the application into at least one speech resource and/or at least one audio resource.

* * * * *